United States Patent [19]

Sugawara

[11] 4,392,836
[45] Jul. 12, 1983

[54] DEVICE FOR CONNECTING SPEEDOMETER TO FLEXIBLE SHAFT

[75] Inventor: Noboru Sugawara, Ageo, Japan

[73] Assignee: Kanto Seiki Co., Ltd., Saitama, Japan

[21] Appl. No.: 265,160

[22] Filed: May 19, 1981

[30] Foreign Application Priority Data

May 21, 1980 [JP] Japan .............................. 55-69627[U]

[51] Int. Cl.³ .......................... F16B 21/00; F16C 1/06; F16D 1/00
[52] U.S. Cl. ..................................... 464/52; 285/320; 403/330; 411/522; 464/901
[58] Field of Search ................. 464/52, 170, 177, 901; 285/319, 320; 403/326, 330; 411/517–522; 24/223, 248 B, 250, 258

[56] References Cited

U.S. PATENT DOCUMENTS

| | | | |
|---|---|---|---|
| 1,815,407 | 7/1931 | Jones | 403/330 X |
| 3,234,757 | 2/1966 | Stadelmann | 464/52 |
| 3,245,703 | 4/1966 | Manly | 285/319 |
| 3,250,551 | 5/1966 | Draudt | 285/319 X |
| 3,602,009 | 8/1971 | Powell | 464/52 |
| 3,686,896 | 8/1972 | Rutter | 464/52 |
| 4,068,870 | 1/1978 | Whitney et al. | 285/320 |

Primary Examiner—Stuart S. Levy
Assistant Examiner—Daniel P. Stodola
Attorney, Agent, or Firm—Toren, McGeady and Stanger

[57] ABSTRACT

A device for connecting a speedometer to a flexible shaft has an annular groove provided round the outer circumference of the stem of the meter, the stem being pierced by a rotating shaft which is connected to the inner shaft of the flexible shaft and is arranged to be rotated by the rotation of the inner shaft; a connecting tube consisting of a front tube part which is arranged to be fitted onto the stem and is provided with a pair of piercing holes confronting each other and a rear tube part which is coupled with the front tube part and is secured to the end of the flexible shaft; and a U-shaped embracing or arm member which is made of an elastic material and is provided with a pair of confronting claws at both ends thereof. The arm member is arranged to be fitted onto the outer circumference of the front tube part in such a way as to embrace it with the claws engaging the piercing holes. The claws are arranged to enter and engage the annular groove when the front tube part is fitted onto the stem.

3 Claims, 7 Drawing Figures

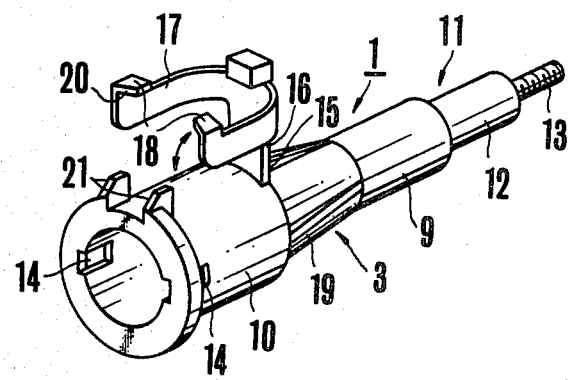
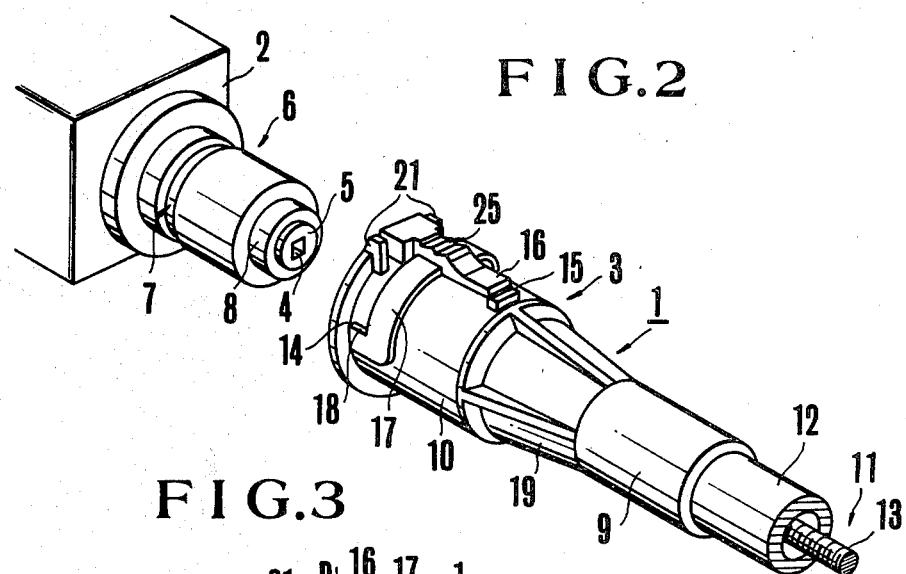
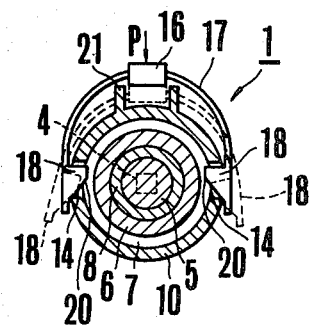

DEVICE FOR CONNECTING SPEEDOMETER TO FLEXIBLE SHAFT

BACKGROUND OF THE INVENTION

1. Field of the Invention

This invention relates to a device for connecting a meter for a motor vehicle, such as speedometer, to a flexible shaft to be used for driving the meter.

2. Description of the Prior Art

There has been known a connecting device of this class in which the boss of a speedometer is provided with a thread and is arranged to have a union nut which is provided on the outer tube of a flexible shaft come into screwed engagement therewith. The union nut is carried by an end metal piece which is provided at the end of the flexible shaft. The speedometer is connected to the flexible shaft by screwing the union nut to the above stated thread. However, with the conventional device used for connecting the speedometer to the flexible shaft, the union nut must be screwed to the above stated thread. Such connecting work not only takes time but also is very difficult to perform because of the extremely limited space available for mounting the meter within the body of a motor vehicle. Therefore, much time and labor have been required for connecting and disconnecting the speedometer to and from the flexible shaft. In addition to this drawback, another drawback of the conventional device lies in that the device necessitates the use of many parts including the union nut. This not only results in taking a longer time for assembling and mounting but also results in a higher price of the product.

SUMMARY OF THE INVENTION

It is therefore a general object of the present invention to provide a device for connecting a speedometer to a flexible shaft which eliminates the above stated drawbacks of the conventional connecting device. The connecting device according to the present invention enables to connect a speedometer to a flexible shaft easily and reliably and enables to perform disconnecting work also easily and quickly. Further, the invented connecting device is economical because it has a lesser number of parts required than the conventional device.

The above and further objects, features and advantages of the invention will become more apparent from the following detailed description of preferred embodiments thereof taken in connection with the accompanying drawings.

BRIEF DESCRIPTION OF THE DRAWINGS

FIG. 1 is an oblique view showing the essential parts of the connecting device of the present invention as a first example of embodiment thereof.

FIG. 2 is an oblique view of the first embodiment example.

FIG. 3 is a sectional view showing the same device as in a connecting state.

DETAILED DESCRIPTION OF PREFERRED EMBODIMENTS

Figure 4:
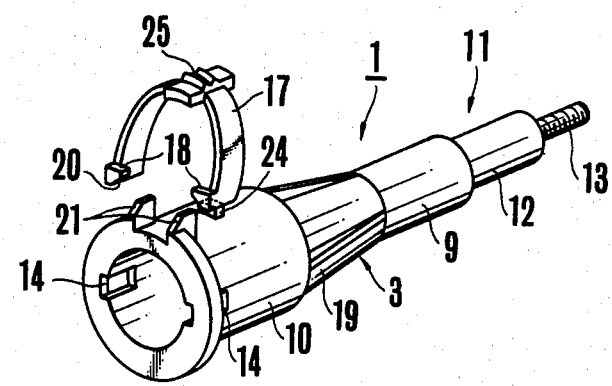
FIGS. 4 and 5 are oblique views respectively showing the essential parts of a second example of embodiment of the invention.
Figure 5:
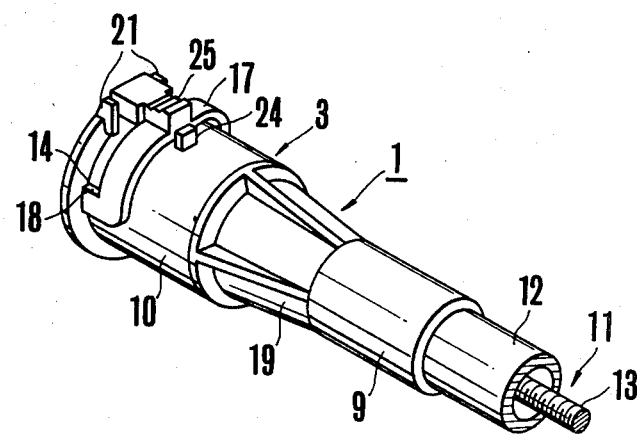
Figure 6:
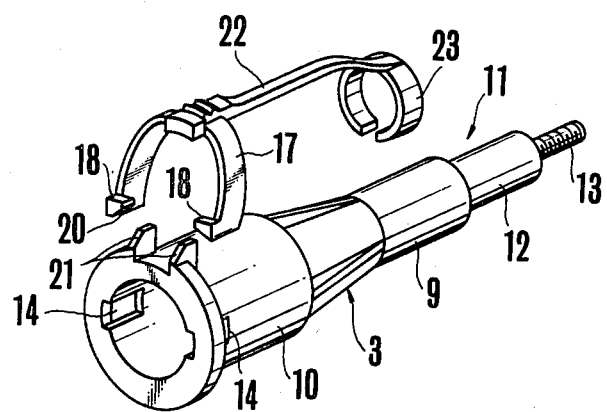
FIGS. 6 and 7 are oblique views showing the essential parts of a third example of embodiment of the invention.

Referring to the accompanying drawings FIGS. 1, 2 and 3 which show the first example of embodiment of the invention, a connecting device 1 is adapted for connecting the stem 6 of an eddy current type speedometer 2 to one end of a flexible shaft 11. The connecting device 1 as a whole is composed of a connecting tube 3 which is made of a synthetic resin material. The connecting tube 3 consists of a front tube part 10 and a rear tube part 9. The two tube parts 10 and 9 are connected to each other by a tapered tube part 19 with their axes in alignment. The front tube part 10 is fitted onto the stem 6 of the speedometer 2. Meanwhile, the rear tube part 9 is arranged to be fitted onto and welded to one end of an outer tube 12 of the flexible shaft 11.

In the peripheral portion of the open end of the front tube 10, there are provided a pair of piercing holes 14 shown in FIG. 1 and FIG. 3. A lever 16 made of a synthetic resin material is disposed behind the piercing holes 14 and is arranged to stand up there. The lever 16 is arranged to be swingable in the direction of an arrow shown in FIG. 1 by virtue of a thin wall part 15 provided in the vicinity of the rising part of the lever 16. The fore end part of the lever 16 is unified with an intermediate part of an arm member 17 which is elastically formed into a U shape. The intermediate part of the arm member 17 is disposed perpendicular to the lever 16. At both ends of the arm member 17, there are provided a pair of claws 18 which are facing inward to confront each other. Under the condition as shown in FIG. 1, distance between the two claws 18 is a little shorter than distance between the above stated two piercing holes 14. When the lever 16 is pushed down to have the arm member 16 fitted onto the front tube part 10 in a manner embracing it from both sides thereof, the two claws 18 come to be inserted into the two piercing holes 14 and to project further into the inside of the front tube part 10.

In FIG. 2, there is shown an annular groove 7 which is provided around the outer circumference of the above stated stem 6. When the front tube part 10 is fitted onto the stem 6, the tips of the two claws 18 come to enter and engage this annular groove 7 to have thereby the connecting device 1 connected to the speedometer 2. The stem 6 has a rotating shaft 5 rotatably carried by the stem 6 through a bush 8. With the front tube part 10 fitted onto the stem 6, an end part of an inner shaft 13 is fitted into a square hole 4 provided in the rotating shaft 5. When the inner shaft 13 rotates under this condition, the rotating shaft 5 rotates together with the inner shaft 13. Then, a magnet which is not shown but is secured to the rotating shaft 5 rotates to produce an eddy current, which in turn produces an indicating torque of the speedometer 2.

In using the connecting device 1 which is arranged in the manner as described in the foregoing, the rear tube part 9 of the connecting tube 3 is fitted onto the end part of the outer tube 12 of the flexible shaft 11 and, after that, is secured thereto by welding. Further, for preparing the connecting tube 3, the lever 16 which is upstanding as shown in FIG. 1 is pushed down to have the arm member 17 fitted onto the outer circumference of the front tube part 10 and, at the same time, the two claws 18 are engaged with the two piercing holes 14 by inserting them into these holes (FIG. 2).

Under this condition, the front tube part 10 is fitted onto the stem 6 of the speedometer 2. In this instance, the two claws 18 are pushed by the outer circumferential face of the stem 6 to be thus once shrunk back to a position flush with the outer circumference of the stem 6 before they reach the annular groove 7 for engagement therewith. Concurrently with this, the end part of the inner shaft 13 of the flexible shaft 11 is fitted into the square hole 4 of the rotating shaft 5 thus to connect the flexible shaft 11 to the speedometer 2.

To disconnect the speedometer 2 from the flexible shaft 11, a pressing part 25 of the lever 16 is pushed in the direction P shown by an arrow in FIG. 3 along the guide pieces 21 provided on the front tube part 10. With the lever 16 pushed in this manner, the slanting face 20 of each claw 18 engages the edge of each of the piercing holes 14 to move the claws 18 in the directions of moving them away from each other as shown by dotted lines in FIG. 3. This movement brings the two claws 18 out of the annular groove 7. While they are thus disengaged from the groove 7, the connecting tube 3 is pulled away from the speedometer 2 to disconnect the meter 2 from the flexible shaft 11.

FIGS. 4, 5, 6 and 7 shows the second and third embodiment examples of the invention. These examples are arranged for the most part in the same manner as the example shown in FIGS. 1 through 3. Therefore, in FIGS. 4 through 7, the same parts are indicated by the same reference numerals while description of them is omitted here. The points in which the second and third examples differ from the first are as described below:

In the second embodiment example, the arm member 17 is formed separately from the connecting tube 3 and is arranged to embrace the front tube part 10 by its own resilience. Besides this difference, the arm member 17 is arranged to be prevented from moving backward by means of a stopper 24 which is provided on the outer circumference of the front tube part 10.

Figure 7:
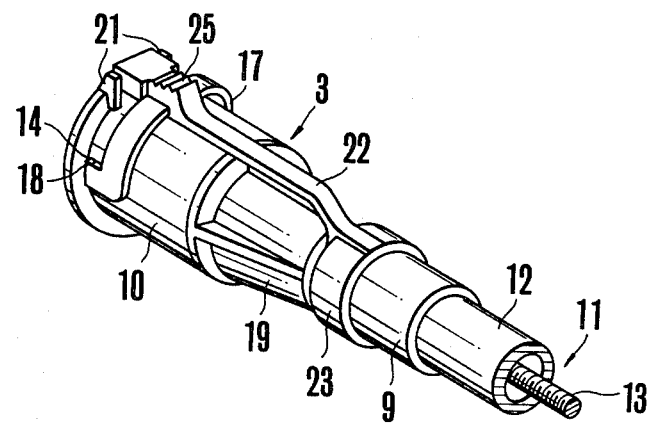

In the case of the third embodiment example, the arm member 17 is not only formed separately from the connecting tube 3 but is provided with a connecting rod 22 which is formed into one unified body with the intermediate part of the arm member 17. At the fore end of the connecting rod 22, there is provided a ring 33. The ring 33 is mounted on the connecting tube 3 by fitting it onto the rear tube part 9 of the connecting tube 3 while the arm member 17 is fitted onto the front tube part 10 (FIG. 7).

Both the second and thid embodiment examples are arranged to have the speedometer 2 connected to and disconnected from the flexible shaft 11 in the same manner as in the first example.

As described herein-above, the pair of inwardly protruding claws 18 provided on the both ends of the U-shaped arem member 17 are inserted through the pair of piercing holes 14 in the front tube 10, so that the U-shaped arm member 17 is engaged with and supported by the front tube 10 without danger of disengagement therewith. Therefore, in the present invention, it is not necessary to elastically support the U-shaped arm member by means of the lever 16 or the connecting rod 22, although it is preferable.

For dismounting the flexible shaft 11 from the stem 6, the pressing part 25 can be easily pushed down with a small pressing force only against the elastic restoration of the U-shaped arm member 17. This is very advantageous especially when the removal operation of the flexible shaft 11 must be done in a very limited space in the back-side of the meter panel in an automobile.

Also the U-shaped arm member 17 can be easily engaged with the front tube 10 due to the insertion of the claws into the piercing holes, and the claws and the piercing holes provide a position determining means for the U-shaped arm member so that the arm member can be engaged with the front tube without paying special attention for the engagement position. Further, the U-shaped arm member 17 and the lever 16 can be formed by plastic formation unitarily with the connecting tube 3, in a standing-up state therefrom, and the connecting of the speedometer to the flexible shaft can be easily done in spot only by turning or pivoting down the U-shaped arm member.

The device of the invention being arranged in the manner as described in the foregoing, the speedometer can be easily connected to the flexible driving shaft by just fitting the front tube part of the connecting tube onto the stem of the speedometer. Besides, this fitting process does not require any step of adjusting the position of the connecting tube to a specific position. The connecting work, therefore, can be simply and easily performed. Then, in disconnecting the speedometer from the flexible shaft, the disconnecting work can be also very simply and easily performed by just pushing the arm member against the above stated connecting tube. Further, since the number of parts involved is not many, the invented device has an economic advantage.

What is claimed is:

1. An assembly comprising a speedometer, a flexible shaft, and a device for connecting said flexible shaft to said speedometer, said speedometer including an axially extending stem with an outer circumferential surface, an annular groove formed in and extending around said circumferential surface, a rotating shaft extending through said stem, said flexible shaft includes an axially extending inner shaft, said inner shaft is coupled to and rotates said rotating shaft, said device comprises a connecting tube formed of a synthetic resin, said connecting tube includes a front tube part positioned around said stem, said front tube part having a pair of diametrically opposite piercing holes, a rear tube part positioned around said flexible shaft, said front tube part having a larger diameter than said rear tube part, and a tapered tube part extending between and interconnecting said front and rear tube parts with the axes of said front, tapered, and rear tube parts disposed in axial alignment, a lever formed integrally with said connecting tube at the location of the connection of said tapered tube part to said front tube part, said lever connected to said connecting tube by a thin walled hinge part and said lever being pivotally displaceable between a first position standing upwardly from said connecting tube and a second position pivoted downwardly toward and extending in the axial direction of said front tube part, a U-shaped arm extending transversely of and formed integrally with said lever at a location between the opposite ends of said arm, the opposite ends of said U-shaped arm being elastically deformable toward and away from one another, each of said opposite ends has a claw extending toward said claw on the other said opposite end, said U-shaped arm is dimensioned to fit around said front tube part and is displaceable with said lever from the first position where it is spaced from said front tube part into the second position where it fits partly around the outside surface of said front part and initially said claws deform outwardly away from one another and then said claws engage into said piercing holes with the inner ends of said claws engaging into said annular groove formed in the circumferential surface of said stem when said front tube part fits over said stem.

2. An assembly, as set forth in claim 1, including means formed on the end of said front tube part spaced from said tapered tube part for guiding said lever when said lever is moved into the second position.

3. An assembly, as set forth in claim 2, wherein each said claw has an edge surface extending obliquely to the adjacent edge of said piercing hole when said claw is in the second position of said lever, a pressing part on said lever spaced from said thin walled hinge part for pressing said lever inwardly toward said front tube part whereby the obliquely extending edges on said claws engage the corresponding edges of said piercing holes for moving said claws outwardly for disengaging said claws from engagement with said annular groove in said stem.

* * * * *